United States Patent

Moriga et al.

Patent Number: 5,677,053
Date of Patent: Oct. 14, 1997

[54] ACRYLIC PLASTISOL ADHESION STRUCTURE

[75] Inventors: Toshinori Moriga, Tokyo; Shunji Kojima, Yokosuka; Seishichi Kobayashi, Yokohama; Yusuke Obu, Tokyo; Shinji Odajima, Hiratsuka, all of Japan

[73] Assignee: Toyo Seikan Kaisha, Ltd., Tokyo, Japan

[21] Appl. No.: 671,677

[22] Filed: Jun. 28, 1996

[30] Foreign Application Priority Data

Jun. 29, 1995 [JP] Japan .................. 7-163699

[51] Int. Cl.⁶ .................. B32B 15/08; B32B 27/08; B32B 27/22
[52] U.S. Cl. .................. 428/347; 427/384; 428/416; 428/418; 428/500
[58] Field of Search .................. 428/416, 418, 428/520, 500, 522, 347, 413; 528/106; 427/384

[56] References Cited

U.S. PATENT DOCUMENTS

| | | | |
|---|---|---|---|
| 3,993,841 | 11/1976 | Matsubara et al. | 428/418 |
| 4,173,290 | 11/1979 | Kobayashi et al. | 220/75 |
| 4,210,567 | 7/1980 | Kosters | 260/31.8 |
| 5,223,025 | 6/1993 | Seibel | 106/14.37 |
| 5,441,994 | 8/1995 | Moriga et al. | 523/201 |

Primary Examiner—Paul J. Thibodeau
Assistant Examiner—Holly C. Rickman
Attorney, Agent, or Firm—Sughrue, Mion, Zinn, Macpeak and Seas

[57] ABSTRACT

An adhesion structure in which the gel of an acrylic plastisol is strongly adhered to the metallic base material, featuring excellent resistance against corrosion and exhibiting small whitening tendency even under severe conditions for treatment with hot water such as retort processing, and a method of producing the same structure. The acrylic plastisol is applied onto the metallic base material or onto the metallic base material having an organic coating provided with a layer of a thermosetting resin which contains a bisphenol-type epoxy resin and a phenolic resin at a weight ratio of from 99:1 to 85:15, and is gelled by heating and is, at the same time, adhered to the base material via the thermosetting resin layer. The acrylic plastisol is gelled and is strongly adhered onto the thermosetting resin layer within short periods of time. The obtained adhesion structure exhibits excellent resistance against peeling, corrosion and retorting.

11 Claims, 2 Drawing Sheets

ACRYLIC PLASTISOL ADHESION STRUCTURE

BACKGROUND OF THE INVENTION

1. Field of the Invention

The present invention relates to an adhesion structure of an acrylic plastisol and a metallic base material or a coated metallic base material. More particularly, the invention relates to an adhesion structure which is useful as a metal cap using acrylic plastisol as a sealing liner.

2. Prior Art

So far, a PVC (vinyl chloride resin) plastisol is the sole material that has been found practical for use as the liner for metal caps of large diameters such as white caps. In connection with this, vinyl chloride type coating materials such as PVC organosols have been extensively used for adhering the liner and the metallic base material together and as protection films for imparting corrosion resistance to the metallic base materials.

Since vinyl chloride monomer is harmful to the human body, releases hydrogen chloride upon receiving the action of heat and light, forms dioxin under particular environment, and is hazardous when metal scraps are recycled, it has been urged to develop substances to substitute for the PVC plastisols and PVC organosols.

As the plastisol of the non-vinyl chloride type, an acrylic plastisol has long been known as disclosed in Japanese Patent Publication No. 16177/1980 which, however, is not still satisfactory with regard to usable time of the sol and mechanical properties, and has not yet been put into practical use.

Only in recent years, a non-vinyl chloride type plastisol having properties comparable with those of PVC plastisol has been developed using a cross-linked acrylic plastisol as disclosed in Japanese Laid-Open Patent Publication No. 322218/1934 and Japanese Patent Application No. 330832/1993.

As the protection film for imparting corrosion resistance to the metallic base material, on the other hand, many compounds have heretofore been known in addition to those of the vinyl chloride type.

White caps and screw caps are opened and closed repetitively by a consumer until the content is all consumed. From the standpoint of re-sealing property, it is essential that the liner strongly fits to the cap shell so that it will not escape therefrom.

In order to put the non-vinyl chloride type plastisol into practical use, adhesion was studied between the plastisol and the existing protection films for imparting corrosion resistance. It was found that there exists no combination of the plastisol and the metal protection film that firmly adhere to each other.

In the combination of the PVC plastisol and the PVC organosol, the adhesion takes place between the polymers of the same kind (nearly the same polymers). Therefore, the metallic base material coated with the PVC organosol is lined with the PVC plastisol which is then gelled by heating effected for a relatively short period of time of several tens of seconds, and the coated film and the sol (gel) are rendered compatible to adhere firmly.

As for the non-vinyl chloride type plastisol, on the other hand, there exists no metal protection film which is compatible thereto. Even when a resin film happens to exhibit good compatibility thereto, it could not withstand the molding and could not be used as a film for protecting the metallic base materials.

Besides, a very high molecular weight of the resin used for the non-vinyl chloride type plastisol makes the adhesion difficult with respect to the metal protection film. In the application for sealing caps, the resin used for the PVC plastisol has a number average molecular weight of several tens of thousand. However, the resin used for the non-vinyl chloride type plastisol has a number average molecular weight of at least several hundred thousand and often larger than a million from the standpoint of mechanical properties of the gel. An increase in the molecular weight of the resin makes it difficult to form a diffusion layer between the resin layers and to accomplish adhesion as will be obvious from the theory of adhesion.

SUMMARY OF THE INVENTION

The present inventors have discovered the fact that when the acrylic plastisol is applied to a metallic base material or to a metallic base material having an organic coating provided with a thermosetting resin layer containing an epoxy resin of a particular composition and a phenolic resin, and is heated, the acrylic plastisol is gelled and firmly adheres to the resin layer.

The object of the present invention is to provide an adhesion structure in which the gel of the acrylic plastisol is firmly adhered to the metallic base material, the adhesion structure exhibiting excellent corrosion resistance without developing whitening tendency even under severe conditions of treatment with hot water such as retort treatment.

Another object of the present invention is to provide a method of producing an adhesion structure wherein the acrylic plastisol is gelled and is adhered to the base material within short periods of time, featuring excellent anti-peeling property of the gel, corrosion resistance of the metallic base material, and resistance against hot water and whitening of the coated film.

According to the present invention, there is provided an adhesion structure comprising a metallic base material or a metallic base material having an organic coating and a gel of an acrylic plastisol which are adhered together via a thermosetting resin layer which contains a bisphenol-type epoxy resin and a phenolic resin at a weight ratio of from 99:1 to 85:15 and, particularly, from 97:3 to 91:9.

It is desired that the bisphenol-type epoxy resin in the thermosetting resin has a number average molecular weight of from 5,000 to 50,000 and an epoxy equivalent which is not smaller than 3,500.

It is desired that the phenolic resin in the thermosetting resin is the one derived from a bifunctional monocyclic phenol and/or bisphenols and has a number average molecular weight of from 200 to 1,000.

On the other hand, it is desired that the acrylic plastisol has a number average molecular weight of not smaller than 100,000.

In a typical application example of the present invention, the metallic base material or the metallic base material having an organic coating is a closure, and the acrylic plastisol is a liner for sealing.

For the applications where high degree of corrosion resistance is required, it is desired that the metallic base material having an organic coating is coated with a curable film which contains the bisphenol-type epoxy resin and the phenolic resin at a weight ratio of from 85:15 to 70:30, and has an MEK extraction factor at a boiling point over one hour of not larger than 8%.

According to the present invention, furthermore, there is provided a method of producing an adhesion structure by applying an acrylic plastisol onto a metallic base material or a metallic base material having an organic coating which is provided with a thermosetting resin layer that contains a bisphenol-type epoxy resin and a phenolic resin at a weight ratio of from 99:1 to 85:15 and, particularly, from 97:3 to 91:9, gelling the acrylic plastisol by heating and, at the same time, adhering the acrylic plastisol onto the base material via said thermosetting resin layer.

DETAILED DESCRIPTION OF THE INVENTION

Figure 1:
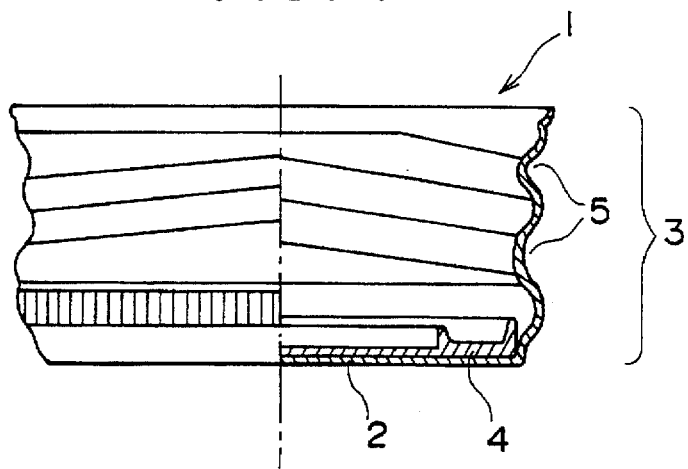
FIG. 1 is a sectional view illustrating an adhesion structure which is a container closure.

The present invention is based on a discovery that when an acrylic plastisol is applied onto a thermosetting resin layer which contains a bisphenol-type epoxy resin and a phenolic resin at a particular ratio and is gelled by heating, the gel is strongly adhered onto the thermosetting resin, and the thus obtained adhesion structure exhibits markedly excellent resistance against retorting. The thermosetting resin layer used in the present invention has a feature in that it exhibits double actions, i.e., action as a protection layer for protecting the metallic base material and action as an adhesion layer to the gel of an acrylic plastisol.

That is, in the thermosetting resin layer used in the present invention, what is particularly important is that the bisphenol-type epoxy resin and the phenolic resin are contained at a weight ratio of from 99:1 to 85:15 and, particularly, from 97:3 to 91:9 in order to enhance adhesion force to the gel of an acrylic plastisol, and to enhance the resistance of the adhesion structure against retorting.

Reference should be made to Table 1 of Examples appearing later. When the amount of the epoxy resin is smaller than the above-mentioned range, the adhesion force to the gelled acrylic resin becomes smaller than 1 kgf/10 mm. When the epoxy resin is blended in an amount larger than the above-mentioned range, on the other hand, the adhesion force becomes greater than 1.5 kgf/10 mm and, particularly, greater than 2.0 kgf/10 mm. When the amount of the phenolic resin is smaller than the above-mentioned range, the thermosetting resin layer loses resistance against retorting, and the adhesion structure loses resistance against retorting, too.

In the thermosetting resin used in the present invention, it is considered that what is helpful for the adhesion to the gelled acrylic resin is a bisphenol-type epoxy resin component as will become obvious from Examples. That is, it is considered that the bisphenol-type epoxy resin component in the thermosetting resin is contacted with the acrylic plastisol that is heated, and a strongly adhered bond is formed as the sol is gelled. On the other hand, the phenolic resin component in the thermosetting resin is a curing component and works to cure the epoxy resin to thereby impart resistance against retorting.

In the thermosetting resin of the present invention, it is important, in relation to using the phenolic resin which is a curing agent in a relatively small amount, to use the high molecular bisphenol-type epoxy resin having a number average molecular weight of from 5,000 to 50,000 and an epoxy equivalent of not smaller than 3,500 as the epoxy resin from the standpoint of enhancing resistance of the coating against retorting and increasing the strength and cohesive force.

When the molecular weight and epoxy equivalent of the epoxy resin are smaller than the above-mentioned ranges, whitening takes place through the retorting and the resistance of the coating is greatly deteriorated as shown in Table 4 appearing later. When the molecular weight of the epoxy resin becomes greater than the above-mentioned range, on the other hand, the operation efficiency for coating the thermosetting resin decreases.

It is further important that the phenolic resin component is the one derived from a bifunctional monocyclic phenol and/or bisphenols and has a number average molecular weight of from 200 to 1000, from the standpoint of physical properties of the thermosetting resin layer, adhesiveness to the base material, resistance against retorting, etc. That is, the concentration of the functional groups, i.e., methylol groups of the phenol resin varies in reverse proportion to the number average molecular weight. When the concentration is larger than the above-mentioned range, the resistance against retorting and adhesiveness to the base material decrease. When the concentration is smaller than the above-mentioned range, on the other hand, properties of the coating are deteriorated, and adhesion to the gelled acrylic resin decreases.

According to the present invention, a metallic base material or a metallic base material having an organic coating is provided with the thermosetting resin layer which comprises the epoxy resin and the phenolic resin, and the acrylic plastisol is adhered thereto as it is gelled. By providing, under the thermosetting resin layer, a curable coating material which contains the bisphenol-type epoxy resin and the phenolic resin at a weight ratio of 85:15 to 70:30 and having an MEK extraction factor at a boiling point over one hour of smaller than 8%, furthermore, it is allowed to obtain an adhesion structure having more excellent corrosion resistance, retort resistance, and resistance against peeling.

In relation to the mechanical strength and resistance against creeping of the gelled acrylic resin formed of the acrylic plastisol, furthermore, it is desired that the acrylic resin in the plastisol has a number average molecular weight of not smaller than 100,000 and, particularly, not smaller than 1,000,000.

From the standpoint of mechanical properties and thermal properties of the gelled resin of the acrylic plastisol, it is desired that the acrylic resin comprises a methyl methacrylate (MMA) as a main monomer component. From the standpoint of storage stability of the plastisol, furthermore, it is desired that the acrylic resin contains a small amount of a functional group-containing monomer component.

From the standpoint of properties of the finally gelled acrylic resin and adhesiveness to the base material, furthermore, it is desired that the acrylic plastisol contains a plasticizer having a solubility parameter (SP value) of from 8.9 to 9.7, i.e., contains a plasticizer exhibiting excellent compatibility to both the acrylic resin and the epoxy resin.

Moreover, when there is used the acrylic plastisol which contains a functional group-containing acrylic resin and a cross-linking agent that reacts with the functional groups, not only the mechanical properties of the finally gelled acrylic resin are improved but also an increased adhesion force is obtained via the thermosetting resin layer.

When the acrylic resin in the acrylic plastisol contains 10 to 80% of tetrahydrofuran-insoluble components, the plastisol exhibits improved storage stability and the finally gelled acrylic resin exhibits improved mechanical properties as well.

The adhesion structure of the present invention exhibits particularly distinguished advantage when the metallic base material or the metallic base material having an organic coating is a container closure and the acrylic plastisol is a liner for sealing. In this case, the liner does not escape in the hopper for feeding, and a container closure is supplied exhibiting excellent retort resistance, sustained sealing property, pressure-resistant sealing property, etc., the container closure being capable of easily disposed of and being friendly to the environment.

According to the method of producing adhesion structure of the present invention, the acrylic plastisol is applied onto the base material provided with the thermosetting resin layer which comprises the epoxy resin component and the phenol resin component, and is simply heated, whereby the plastisol is gelled and is, at the same time, adhered to the base material, making it possible to easily produce the structure which is adhered as a unitary structure. The gelling and adhesion are accomplished within a short period of time of, for example, not longer than 90 seconds, creating another advantage of the present invention.

(Preferred Embodiments)

[Outline of the Adhesion Structure and Method of Producing the Same]

Referring to FIG. 1 illustrating the adhesion structure of the form of a container closure, a metallic base material 1 or a metallic base material having an organic coating is a cap shell provided with a top panel 2 and a short peripheral wall 3. On the inside of the top panel 2 of the cap is provided a liner 4 for sealing composed of a gelled product of a plastisol. On the peripheral wall 3 is formed a screw 5 for engagement with the mouth of the container.

Figure 2:
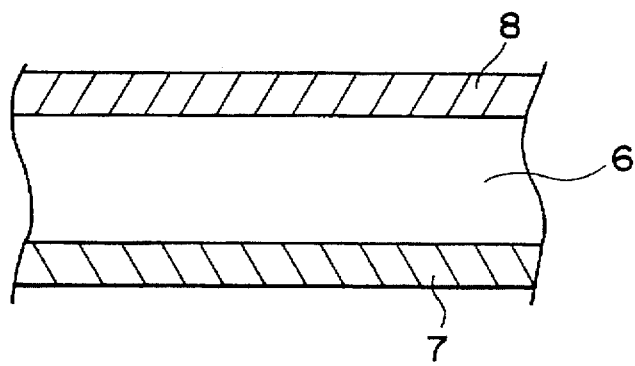
FIG. 2 is a sectional view illustrating, on an enlarged scale, an example of a portion of the top panel of the container closure of FIG. 1.

Referring to FIG. 2 which is a sectional view illustrating an example of a portion of the top panel 2 on an enlarged scale, the cap shell comprises a metallic base material 6, an outer protection coating applied to the outer surface thereof, and a particular thermosetting resin layer 8 applied to the inner surface thereof. The thermosetting resin layer 8 comprises a thermosetting resin which contains the bisphenol-type epoxy resin and the phenolic resin at the above-mentioned particular ratio, and the liner 4 made of an acrylic resin is strongly adhered to the base material via the thermosetting resin layer 8. The outer protection coating 7 may be the same as the above-mentioned thermosetting resin layer 8 or may be a generally employed protection coating.

Figure 3:
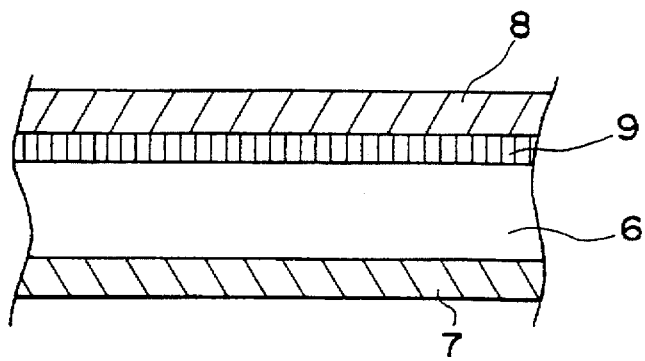
FIG. 3 is a sectional view illustrating, on an enlarged scale, another example of a portion of the top panel of the container closure of FIG. 1.

Referring to FIG. 3 which is a sectional view illustrating another example of a portion of the top panel 2 on an enlarged scale, the cap shell 1 comprises the metallic base material 6, the outer protection coating 7 applied to the outer surface thereof, the inner protection coating 9 applied to the inner surface thereof, and a particular thermosetting resin layer 8 applied onto the inner protection coating 9. Even this thermosetting resin layer 8 comprises the thermosetting resin which contains the bisphenol-type epoxy resin and the phenolic resin at the above-mentioned particular ratio, and the liner 4 of the acrylic resin is strongly adhered to the base material via the thermosetting resin layer 8. The outer protection coating 7 and the inner protection coating 9 are generally used protection coatings having excellent resistance against corrosion.

Figure 4:
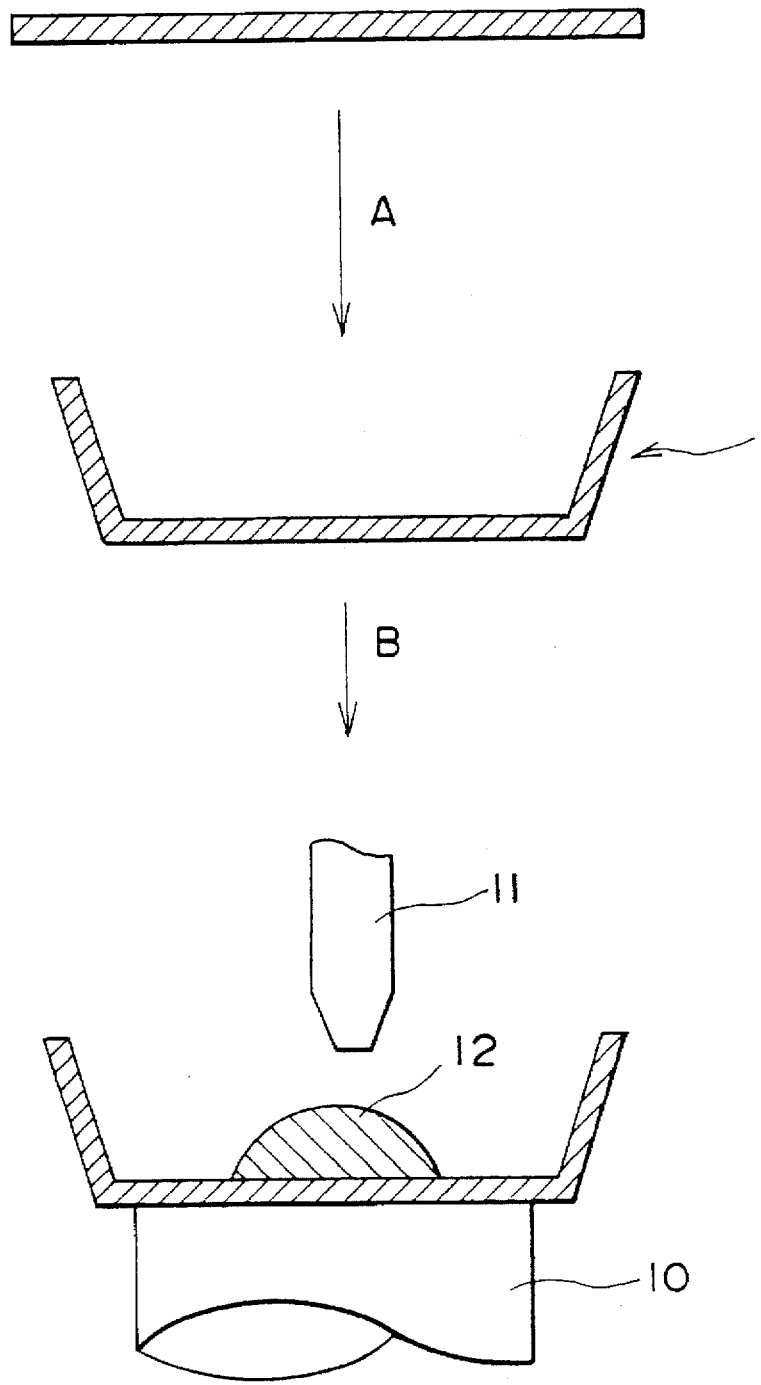
FIG. 4 is a diagram illustrating the steps for producing the adhesion structure of FIG. 1.

In a step A of FIG. 4 illustrating the steps for producing the adhesion structure, a coated metal plate having a cross-sectional structure as shown in FIG. 2 or 3 is formed into the shape of the cap shell 1. In a step B, the cap shell 1 is held on a rotary chuck 10 in a manner that the inner surface is faced upwards, and an acrylic plastisol 12 is poured in a predetermined amount from a nozzle 11 while rotating the cap shell 1. Due to the centrifugal force, the plastisol 12 that is poured onto the inner surface of the top panel is spread over the whole top panel and swells on the peripheral wall portions to therapy form a liner of a predetermined shape. In a further step, the lined cap is fed into a heating oven 2 where the plastisol 12 of the shape of the liner is heated by the hot air or by infrared rays. Thus, the plastisol is gelled and is adhered to the thermosetting resin layer, thereby to form a cap 14 provided with the liner of acrylic resin.

[Metallic Base Material]

The adhesion structure of the present invention can be applied to a field where hermetic sealing is required and, particularly, to the metallic base materials that are widely used in the field of packages. As the metallic base materials, there have been used a variety of metal plates and, particularly, a variety of surface-treated steel plates and light metal plates such as of aluminum and the like.

The surface-treated steel plate is obtained by subjecting a cold-rolled steel plate to the secondary cold rolling after it has been annealed, and effecting one or two or more kinds of surface treatments such as zinc plating, tin plating, nickel plating, chromium plating, electrolytic chromate treatment and chromate treatment. A preferred surface-treated steel plate is an electrolytic chromate-treated steel plate having a metal chromium layer in an amount of from 10 to 200 mg/m$^2$ and a chromium oxide layer in an amount of from 1 to 50 mg/m$^2$ (reckoned as metal chromium). This steel plate exhibits excellent adhesion to the coating and corrosion resistance in combination. Another example of the surface-treated steel plate is a tin plate having a tin plating in an amount of from 0.6 to 11.2 g/m$^2$. It is desired that the tin plate has been treated with chromic acid or chromic acid/phosphoric acid, so that the amount of chromium is from 1 to 30 mg/m$^2$ reckoned as metal chromium. A further example of the surface-treated steel plate is an aluminum-coated steel plate having an aluminum plating or on which aluminum is adhered with the application of pressure.

As the light metal plate, there can be used a so-called pure aluminum plate as well as an aluminum alloy plate. The aluminum alloy plate which features excellent corrosion resistance and machinability has a composition comprising from 0.2 to 1.5% by weight of manganese, from 0.8 to 5% by weight of magnesium, from 0.25 to 0.3% by weight of zinc, and from 0.16 to 0.26% by weight of copper, the remainder being aluminum. It is desired that even the light metal plates are treated with chromic acid or chromic acid/phosphoric acid so that the amount of chromium is from 20 to 300 mg/m$^2$ reckoned as metal chromium.

The thickness of the metal plate varies depending upon the kind of the metal, use and size. In the case of the container closure, the metal plate usually has a thickness of from 0.10 to 0.3 mm and, particularly, from 0.13 to 0.23 mm. It is further desired that the thickness is from 0.13 to 0.20 mm in the case of the surface-treated steel plate, and is from 0.15 to 0.23 mm in the case of the light metal plate.

A thermosetting resin layer comprising an epoxy resin and a phenolic resin at a particular ratio may be directly provided on the metallic base material. Or, a known protection coating having excellent resistance against corrosion may be applied in advance onto the inner surface or the outer surface of the metallic base material. Examples of the protection coating include widely known thermosetting resin coatings such as phenol-formaldehyde resin, furan-formaldehyde resin, xylene-formaldehyde resin, ketone-formaldehyde resin, urea formaldehyde resin, melamine-formaldehyde resin, alkyd resin, unsaturated polyester resin, epoxy resin, bismaleimide resin, triaryl cyanurate resin, thermosetting acrylic resin, silicone resin, oil resin, and the like resins, as well as thermoplastic resin coatings such as vinyl chloride-vinyl acetate copolymer, vinyl chloride-maleic acid copolymer, vinyl chloride-maleic acid-vinyl acetate copolymer, acrylic polymer and saturated polyester resin. These resin coatings can be used in a single kind or in a combination of two or more kinds. It is desired that the protection coating has a thickness of usually from 1 to 20 μm.

The protection coating formed on the metallic base material may further be a film of a thermoplastic polyester such as polyethylene terephthalate or polyethylene terephthalate/isophthalate, etc.

[Thermosetting Resin Layer]

The thermosetting resin which is used as the protection layer/adhesion layer of the present invention contains a bisphenol-type epoxy resin and a phenolic resin at a weight ratio of from 99:1 to 85:15 and, particularly, from 97:3 to 91:9.

A preferred bisphenol-type epoxy resin component is derived from bisphenols and epihalohydrin and has a number average molecular weight of not smaller than 5000 and an epoxy equivalent of not smaller than 3500.

In this specification, bisphenols stand for those phenols having two rings to which are bonded a phenolic hydroxyl group. A representative example of the bisphenols is a divalent phenol expressed by the formula (1),

HO-φ-R-φ-OH    (1)

wherein R denotes a direct bonding or a divalent cross-linking group, and φ is a phenylene group (ortho, meta and/or para).

In the divalent phenol of the formula (1), the divalent cross-linking group R may be an alkylidene group of the formula —CR'R'— (wherein R' are hydrogen atoms, halogen atoms, alkyl groups with not more than 4 carbon atoms or perhaloalkyl groups), or groups —O—, —S—, —SO—, —SO₂— or —NR"— (wherein R" is a hydrogen atom or an alkyl group with not more than 4 carbon atoms) and is, generally, an alkylidene group or an ether group. Preferred examples of the divalent phenol include 2,2'-bis(4-hydroxyphenyl) propane (bisphenol A), 2,2'-bis(4-hydroxyphenyl) butane (bisphenol B), 1,1'-bis(4-hydroxyphenyl) ethane, bis(4-, 3- or 2-hydroxyphenyl) methane (bisphenol F), 4-hydroxyphenyl ether, and p-(4-hydroxy) phenol. Among them, bisphenol A, bisphenol F and bisphenol B are most desired.

The epoxy resin is represented by the following general formula (2),

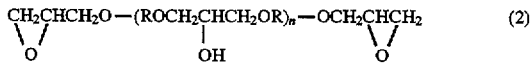    (2)

wherein R is a condensed residue of 2,2'-bis(4-hydroxyphenyl) propane, and n is a number which is so selected that the resin will have an average molecular weight of not smaller than 5000.

A desired epoxy resin is available as Epikote 1010J.

The invention uses a phenolic resin component derived from a bifunctional monocyclic phenol and/or bisphenols and a formaldehyde, and has a number average molecular weight of from 200 to 1000.

The bifunctional monocyclic phenol is the one represented by the following formula (3),

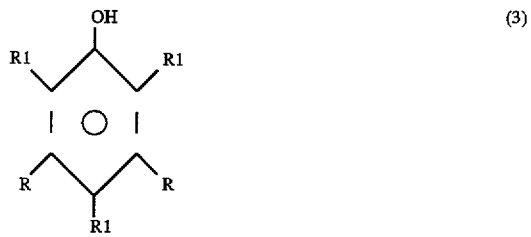    (3)

wherein R1 are hydrogen atoms, alkyl groups with not more than 4 carbon atoms or alkoxyl groups, and two R1 among three R1 are hydrogen atoms, and the remaining R1 is an alkyl group or an alkoxyl group, and R is a hydrogen atom or an alkyl group with not more than 4 carbon atoms, such as o-cresol, p-cresol, p-tert-butylphenol, p-ethylphenol, 2,3-xylenol, and 2,5-xylenol, which may be used in one kind or in a combination or two or more kinds. In addition to the above-mentioned bifunctional phenols of the above-mentioned formula (3), there can be used in combination trifunctional phenols such as phenol (carbolic acid), m-cresol, m-ethylphenol, 3,5-xylenol, and m-methoxyphenol; monofunctional phenols such as 2,4-xylenol, 2,6-xylenol; p-tert-amylphenol, p-nonylphenol, p-phenylphenol and p-cyclohexylphenol in amounts which are so small as will not impair the properties of the bifunctional phenols.

The bisphenols may be those of the formula (1) mentioned in connection with the epoxy resin. It should be noted that the bifunctional monocyclic phenol and bisphenols may be used in combination, as a matter of course.

The resol-type phenolaldehyde resin component used in the present invention is obtained by reacting the above-mentioned phenol with an aldehyde in the presence of a basic catalyst. There is no particular limitation in the amount of the aldehyde with respect to the phenols. The aldehyde can be used at a weight ratio which has heretofore been employed for the production of resol-type resins, i.e., can be used in an amount of not smaller than one mol and, particularly, from 1.5 to 3.0 mols per mol of the phenols. There arises no inconvenience even when the aldehyde is used in an amount smaller than one mole.

It is desired that the condensation is carried out in a suitable reaction medium and, particularly, in an aqueous medium. As the, basic catalyst, there can be used any basic catalyst that has heretofore been used for the production of resol-type resins. Among them, preferred examples include ammonia as well as hydroxides, oxides and basic salts of alkaline earth metals such as magnesium hydroxide, calcium hydroxide, barium hydroxide, magnesium oxide, basic magnesium carbonate, basic magnesium chloride and basic magnesium acetate. These basic catalysts may be made present in the reaction medium in a catalytic amount and, particularly, in an amount of from 0.01 to 0.5 mol%. There is no particular limitation on the condensation conditions, and the heating may be effected generally at a temperature of from 80° to 130° C. for about 1 to about 10 hours.

The formed resin can be refined by a known means. For example, the resin component which is the reaction product is extracted and isolated from the reaction medium with ketone, alcohol, hydrocarbon solvent or a mixture thereof, and is washed, as required, with water to remove unreacted product. Then, water is removed by the azeotropic method or the sedimentation method to obtain a resol-type phenyl-aldehyde resin that can be mixed into the epoxy resin.

The bisphenol-type epoxy resin and the phenolic resin may be mixed together in the form of solutions to use them as a mixture. In general, however, it is desired to precondensate them and apply them in the form of a precondensate onto the metallic base material or onto the metallic base material having an organic coating. It is desired that the precondensation is carried at a temperature of from 100° to 130° C. for about 1 to about 10 hours.

Examples of the solvent for the bisphenol-type epoxy resin and phenolic resin may be aromatic solvents such as toluene, xylene, etc., alcoholic solvents such as ethanol, butanol, etc., cellosolve solvents such as ethyl cellosolve, butyl cellosolve, etc., ketone solvents such as methyl ethyl ketone, cyclohexanone, etc., and ester solvents such as butyl acetate, etc., which may be used in one kind or in two or more kinds. The solid components are dissolved in an amount of 10 to 50% in the solvent to obtain a coating material.

The coating composition may contain known modifying agents and blending agents such as fatty acid, polymerized fatty acid, rosin, drying oil and reforming agents such as xylene resin, etc. based on the precondensation, and may be further blended with levelling agents such as vinylacetal resin, silicone oil, etc., lubricating agents such as wax, etc., and curing promoting agents such as phosphoric acid and a metal salt of naphthenic acid.

The above-mentioned composition can be applied to the material for forming container closure or to the container closure by any means such as dip coating, roller coating, spray coating, brush coating, electrostatic coating, electrodeposition coating, wire coating, flow coating or doctor coating. The thermosetting resin layer has a thickness of usually from 0.5 to 20 microns and, particularly, from 1 to 15 microns when it is dry.

The conditions for curing the thermosetting resin may differ depending upon the kind of epoxy resin component and the kind of phenolic resin component in the resin composition, but are generally selected over a temperature range of from 150° to 230° C. and a baking time of from 2 to 20 minutes, so as to accomplish sufficient degree of curing from the standpoint of resistance against chemicals and resistance against the hot water.

[Acrylic Plastisol]

The plastisol used in the present invention comprises a plasticizer which is a dispersing medium and an acrylic resin which is a layer of dispersed particles.

Examples of the ester of the acrylic acid or the methacrylic acid which is the chief component of the acrylic resin include methyl (meth)acrylate, ethyl (meth)acrylate, isopropyl (meth)acrylate, n-butyl (meth)acrylate, isobutyl (meth) acrylate, n-amyl (meth)acrylate, isoamyl (meth)acrylate, n-hexyl (meth)acrylate, 2-ethylhexyl (meth)acrylate, and n-octyl (meth)acrylate. Here, the above-mentioned (meth) acrylic acid stands for acrylic acid or methacrylic acid. The above-mentioned (meth)acrylic acid esters may be used in a single kind or in a combination of two or more kinds, or may be used being copolymerized with other monomers. Preferred esters may be methyl, ethyl and isopropyl of methacrylic acid and isobutyl ester which, when homopolymerized, form a polymer having a glass transition point of not lower than 60° C. Methyl methacrylate (MMA) is particularly preferred.

Examples of other comonomer that can be copolymerized with these monomers include styrene, vinyltoluene, acrylonitrile, methacrylonitrile and vinyl acetate.

From the standpoint of pot life of the plastisol and mechanical properties of the gel, it is desired that the (meth)acrylic acid ester unit which, when homopolymerized, forms a polymer having a glass transition point of not lower than 60° C., is present in an amount of not smaller than 50% by weight and, particularly, not smaller than 60% by weight with respect to the acrylic resin component.

From the standpoint of storage stability of the plastisol, it is desired that the acrylic resin contains a functional group-containing monomer component in a small amount. The bifunctional group-containing monomer component has carboxyl group, group of a salt thereof, amide group, hydroxyl group, amino group, epoxy group, methylol group and etherified methylol group. Concrete examples are ethylenically unsaturated carboxylic acid or an anhydride thereof, acrylic acid, methacrylic acid, crotonic acid, maleic acid, fumaric acid, itaconic acid, citraconic acid, maleic anhydride, itaconic anhydride, etc.

These acid group-containing monomer units may exist in the form of metal salts such as of sodium, potassium, calcium, etc., or in the form of amine salts.

Examples of the amide group-containing monomer may be a (meth)acrylamide and the like.

Examples of the hydroxyl group-containing monomer unit include vinyl alcohol, ester of hydroxyethyl (meth) acrylate, ester of hydroxypropyl (meth)acrylate, and monoester of propylene glycol acrylate.

Examples of the amino group-containing monomer unit include dimethylaminoethyl (meth)acrylate, t-butylaminoethyl (meth)acrylate, vinylpyridine, 2-vinyl-5-ethylpyridine, oxazolylethyl (meth)acrylate, and hydroxyethylaminoethyl (meth)acrylate.

Examples of the epoxy group-containing monomer include glycidylether (meth)acrylate, allyl glycidyl ether and butane monoxide.

As the monomer having a methylol group and an etherified methylol group, there can be used a dimethylolated product of (meth)acrylamide and etherified products thereof, such as ethyl etherified product and butyl etherified product.

The functional group-containing monomer can exist in the acrylic resin in the form of a random copolymer, a graft copolymer or a block copolymer. When the polymer chains are entangled to a sufficient degree or when the cross-linking effect for coupling the polymer chains can be expected to a sufficient degree, the functional group-containing monomer is allowed to exist in the form of a homopolymer.

The ratio of the functional group-containing monomer component in the acrylic resin particles should be such that the polar groups selected from the group consisting of the above-mentioned carboxyl group, group of a salt thereof, amide group, hydroxyl group, amino group, epoxy group, methylol group and etherified methylol group, are contained at a concentration of from 30 to 330 millimols/100 g of the particles and, particularly, from 50 to 250 millimols/100 g of the particles.

When the concentration of the polar groups is smaller than the above-mentioned range, the pot life is shortened compared to that of the acrylic plastisol of which the concentration of the polar groups lies within the above-mentioned range. What is most important is that when the concentration of the polar groups is smaller than the above-mentioned range, resistance against creeping becomes smaller than that of the acrylic plastisol of which the concentration of the polar groups lies within the above-mentioned range. When the concentration of the polar groups becomes greater than the above-mentioned range, on the other hand, property for forming a soft and tough gel upon heating becomes inferior to that of the acrylic plastisol of which the concentration of the polar groups lies within the above-mentioned range.

From the viewpoint of viscosity stability of the acrylic plastisol, i.e., from the viewpoint of pot life, it is desired that the acrylic resin particles assume a core/shell structure having a core portion consisting chiefly of a (meth)acrylic acid ester unit and a shell portion having a high polar group concentration.

During the storage of the plastisol, the shell portion having a high polar group concentration prevents the plasticizer from entering into the particles. Therefore, the particles are not swollen or are prevented from being dissolved and do not increase the viscosity. Thus, the plastisol features an excellent storage stability (pot life).

Since the polar groups much exist in the outer shell portions of the particles, the cross-linking reaction takes place quickly on the interface of the particles where polymer chains tend to be newly entangled when the plastisol is heated and is gelled, contributing to increasing the resistance against creeping.

The acrylic resin must have a molecular weight large enough for forming a tough gel and is, usually, desired to have a molecular weight of not smaller than 100,000, preferably, not smaller than 200,000 and, most preferably, not smaller than 1,000,000. When the acrylic plastisol is used for the applications where distinguished resistance against creeping is required at high temperatures, the cross-linking structure should be introduced in advance in the step of polymerizing the acrylic resin particles.

The acrylic plastisol exhibits increased mechanical properties of the gel and increased adhesiveness when it contains a cross-linking agent which is reactive to functional groups of the acrylic resin.

The cross-linking agent having epoxy group, hydroxyl group, amino group, isocyanate group, methylol group or etherified methylol group is used for the carboxyl group or group of a salt thereof of the acrylic resin, the cross-linking agent having epoxy group, methylol group or etherified methylol group is used for the amide group, the cross-linking agent having carboxyl group, epoxy group, isocyanate group, methylol group or etherified methylol group is used for the hydroxyl group, the cross-linking agent having epoxy group or isocyanate group is used for the amino group, the cross-linking agent having carboxyl group, group of a salt thereof, acid anhydride group, hydroxyl group, amino group, methylol group or etherified methylol group is used for the epoxy group, and the cross-linking agent having carboxyl group, group of a salt thereof, hydroxyl group, epoxy group, methylol group or etherified methylol group is used for the methylol group and the etherified methylol group.

Examples of such a cross-linking agent component include epoxy compound, methylolated or ether methylolated amino resin, modified or unmodified polyamine, modified or unmodified polyamideamine, and methylolated or ether methylolated phenolic resin.

It is further allowable that the cross-linking agent component is a vinyl-type oligomer or polymer which is reactive to the acrylic resin.

The cross-linking agent components may be used in a single kind or in a combination of plural kinds, or may further be used in combination with other cross-linking assistants or cross-linking catalysts.

The cross-linking agent component that is the non-vinyl type resin is introduced into the acrylic resin particles by preparing a composition of the monomer which contains the cross-linking agent component in a dissolved or in a partly solubilized state at the time of polymerizing the monomer for forming the acrylic resin, emulsifying and suspending the composition in an aqueous phase, and effecting the emulsion polymerization, emulsion seed polymerization, fine suspension polymerization or fine suspension seed polymerization.

A preferred cross-linking agent component dissolves or partly dissolves in the monomer for forming the acrylic resin, and does not work as a polymerization inhibitor during the radical polymerization of the monomer.

Epoxy compound, methylolated or ether methylolated amino resin, and methylolated or ether methylolated phenolic resin exhibit good compatibility to the (meth)acrylic acid ester which is a main component of the acrylic resin. An epoxy compound such as bisphenol-type epoxy resin and a methylolated or ether methylolated amino resin exhibit excellent compatibility without at all adversely affecting the radical polymerization of the monomer.

In general, many cross-linking agents of the type of phenolic resin could become radical polymerization inhibitors.

The cross-linking resin component that is the vinyl-type oligomer or polymer which is reactive to the acrylic resin is introduced into the acrylic resin particles based upon a first introduction method by preparing a composition of the monomer component which contains a separately polymerized reactive vinyl-type oligomer or polymer in a dissolved or partly solubilized state at the time of polymerizing the monomer component for forming the acrylic resin and effecting the emulsion polymerization, emulsion seed polymerization, fine suspension polymerization or fine suspension seed polymerization, based upon a second introduction method by effecting the seed polymerization of the cross-linking resin by using, as a seed, acrylic resin particles that have been emulsion polymerized or fine suspension polymerized or, conversely, by effecting the seed polymerization of the acrylic resin using, as a seed, the cross-linking resin particles, or based upon a third introduction method by subjecting the monomer used for forming the cross-linking resin and the monomer used for forming the acrylic resin simultaneously to the emulsion polymerization, emulsion seed polymerization, fine suspension polymerization or fine suspension seed polymerization.

In general, the cross-linking reaction of the cross-linking agent component and the acrylic resin proceeds on the basis of the ring-opening reaction or the condensation reaction, and the plastisol is gelled at a temperature of from 100° to 250° C. and, particularly, from 150° to 230° C., and the combination of functional groups is selected with which the cross-linking reaction proceeds.

On the other hand, the polymerization of the monomer proceeds on the basis of the radical addition reaction at a temperature of from 25° to 100° C. and, particularly, from 40° to 85° C. At the time of preparing the acrylic resin composition, therefore, the functional group of the cross-linking resin component and the functional group of the acrylic resin have not in many cases been reacted. In a special case such as saving the time required for the crosslinking reaction, however, the functional groups may be employed in such a combination that the cross-linking reaction also proceeds under the conditions for polymerizing the monomers.

Moreover, a macromonomer obtained by reacting a monomer having a functional group with the cross-linking resin component, may often be used for forming the acrylic resin composition.

Examples of the epoxy compound include those having two or more oxirane rings in the molecules and, particularly, the epoxy resins. Among them, it is desired to use a bisphenol-type epoxy resin obtained by the polycondensation of bisphenols such as bisphenol A and bisphenol F with the epichlorohydrin, having an epoxy equivalent of generally from 140 to 4000 and, particularly, from 170 to 2500 and a number average molecular weight of from 290 to 5500 and, particularly, from 350 to 3500.

As the methylolated or ether methylolated amino resin, there can be used a urea resin having many methylol groups in the molecules, a melamine resin and a benzoguanamine resin. The ether-type resins are the above-mentioned resins of which the methylol group is etherified with alcohols such as ethanol or butanol.

The cross-linking resin component that is the nonvinyl type resin is contained in the acrylic resin composition at a ratio of from 0.5 to 30% by weight and, particularly, at a ratio of from 1.0 to 15% by weight.

By taking the functional groups in the cross-linking agent component into account, furthermore, the concentration of the functional groups in the acrylic resin composition should be from 30 to 330 millimols and, particularly, from 50 to 250 millimols per 100 g of the resin composition.

When the concentration of the cross-linking agent is smaller than the above-mentioned range, the resistance against creeping becomes lower than that of the acrylic resin composition of which the concentration of the cross-linking agent lies within the above-mentioned range. When the concentration of the cross-linking agent exceeds the above-mentioned range, on the other hand, the pot life and gelling property become inferior to those of the acrylic resin composition of which the concentration of the cross-linking agent lies within the above-mentioned range.

When the cross-linking agent component is a vinyl-type resin, the ratio of the functional group-containing monomer component in the acrylic resin composition should be from 30 to 330 millimols per 100 g of the particles and, particularly, from 50 to 250 millimols per 100 g of the particles.

As pointed out already, when the concentration of the functional groups becomes smaller than the above-mentioned range, the pot life of the acrylic resin composition becomes inferior to that of the acrylic resin composition of which the concentration of the functional groups lies within the above-mentioned range. What is most important is that when the concentration of the functional groups becomes smaller than the above-mentioned range, the resistance against creeping becomes inferior to that of the acrylic resin composition of which the concentration of the functional groups lies within the above-mentioned range. When the concentration of the functional groups exceeds the above-mentioned range, on the other hand, the gelling property becomes inferior to that of the acrylic resin composition of which the concentration of the functional groups lies within the above-mentioned range.

The acrylic resin particles used in the present invention have a single particle diameter suited for a plastisol of from 0.01 to 10 μm and, particularly, from 0.2 to 5 μm, and are produced by a widely known method such as the emulsion polymerization, emulsion seed polymerization, fine suspension polymerization or fine suspension seed polymerization.

As the plasticizer in the plastisol, there can be used esters of an aromatic dibasic acid or polybasic acid such as phthalic acid, esters of an aliphatic dibasic acid or polybasic acid, esters of phosphoric acid, multi-valent hydroxycarboxylic acid ester, fatty acid ester, polyhydric alcohol ester, or epoxylated oil, that is suited for the acrylic resin.

A preferred plasticizer has a solubility parameter (SP value) which is not smaller than 8.5 but is not larger than 9.7. Here, the solubility parameter (SP value) is widely used as a rough indication for evaluating the compatibility of the substances. The SP value is the one-half power of the cohesive energy density as defined in J. Brandrup et al., "Polymer Handbook", Chapter 4, 1967.

Phthalic acid is exemplified as the aromatic carboxylic acid which constitutes the plasticizer. Adipic acid, azelaic acid or sebacic acid is exemplified as the aliphatic carboxylic acid, and glycolic acid is exemplified as the hydroxycarboxylic acid. As the alkyl group in the ester, there can be used a lower alkyl group such as ethyl, propyl or butyl. Within a range satisfying the above-mentioned molecular weight, there can be further used a higher alkyl group such as isodecyl group, octyl group (ethylhexyl group), etc. and an aralkyl group such as benzyl group or cresyl group.

Concretely speaking, there can be exemplified dibutyl phthalate, butylbenzyl phthalate, acetyltributyl titrate (ATBC), butylphthalylbutyl glycolate, tricresyl phosphate (TCP), etc. Among them, the acetyltributyl citrate (ATBC) is most desired.

The weight ratio of the acrylic resin to the plasticizer is such that a sufficient degree of fluidity is obtained at the time when it is being applied and sufficient properties are obtained at the time when it is being gelled. Generally speaking, it is desired that the plasticizer is used in an amount of from 50 to 120 parts by weight and, particularly, from 60 to 100 parts by weight per 100 parts by weight of the acrylic resin.

The plastisol composition used in the present invention contains the cross-linking resin in a form being partly dissolved or dispersed in the plasticizer. The cross-linking resin in the plasticizer may be the same as, or different from, the cross-linking agent in the acrylic resin particles.

When the plastisol deposition is heated and gelled, the crosslinking agent in the plasticizer effectively works to reinforce the interfaces of the acrylic particles on which the polymer chains are newly entangled, thereby to improve resistance against creeping.

The weight ratio of the acrylic resin to the cross-linking agent in the plasticizer may vary depending upon the concentration of the functional groups in the acrylic resin particles and the concentration of the cross-linking resin. Generally, however, good results are obtained when the cross-linking agent is contained in an amount of not larger than 20 parts by weight and, particularly, not larger than 15 parts by weight per 100 parts by weight of the acrylic resin composition. When the amount of the cross-linking agent is larger than the above-mentioned range, the fluidity decreases when the coating material is being applied or the hardness of the gelled product becomes so high that cushioning property and flexibility are lost, and the ratio of the low molecular components increases causing the resistance against creeping to be deteriorated.

The plastisol may be blended with widely known resin blending agents such as filler, coloring agent, heat stabilizer, foaming agent, antioxidizing agent, viscosity-imparting agent, viscosity-decreasing agent, diluent, oxygen-absorbing agent and the like agents according to known recipe.

The plastisol composition used in the present invention may be prepared according to a known blending method using a known dispersing machine such as mixing and dipping machine, homodisper, spiral pin mixer, Atritor, etc.

[Production of Adhesion Structure]

According to the production method of the present invention, the acrylic plastisol is applied to the metallic base material or the metallic base material having an organic coating which is provided with a thermosetting resin layer containing a bisphenol-type epoxy resin and a phenolic resin at a particular weight ratio, and is gelled by heating so as to be adhered to the base material via the thermosetting resin layer.

The adhesion structure is useful for a variety of applications where the PVC plastisol has been widely used, e.g., useful in the fields of various construction materials equipped with a liner or a gasket, interior articles, furniture, toys, daily necessaries, miscellaneous goods, containers and container closures, and is particularly useful as a closure for sealing containers. Prior to applying the plastisol, the metallic base material provided with the thermosetting resin layer is formed into a predetermined shape.

The plastisol is applied by spreading method, dipping method, spin coating method, gravure coating method, spray coating method or screen coating method. The spin coating method is effective in forming a gasket or a liner for various containers or container closures.

It is desired that the acrylic plastisol has a viscosity at room temperature of generally from 5 to 500 poises from the standpoint of operability such as coating and molding. At the time of gelling, on the other hand, it is desired that the acrylic plastisol exhibits a hardness of from 30 to 75 (JIS-A) for the applications of the gaskets and liners, though it may vary depending upon the applications.

The gelling and adhesion of the plastisol can be easily accomplished based upon heating at a temperature of from 150° to 250° C. and, particularly, from 180° to 220° C. for 1 to 3 minutes.

(EXAMPLES)

The invention will be described in further detail by way of Examples in which percents, parts and ratios are all by weight unless otherwise stated.

[Preparation of Acrylic Plastisol]

Into a 2-liter round-bottomed separable flask were introduced 400 g of a monomer, 0.5 g of an azobisisobutylonitrile (AIBN), 2.8 g of a cetyl alcohol, and 2.0 g of a-stearyl alcohol, which were then dissolved with stirring (in order to adjust the molecular weight, the above monomer solution was blended with an n-dodecylmercaptane in an amount of not larger than 0.5 g). Next, a mixture of 4 g of dodecylsodium sulfate and 450 g of distilled water was added thereto, and the mixture was stirred by using a quick homo-mixer at a speed of as high as 12000 rpm for 10 minutes to prepare a fine suspension which was then diluted by the addition of 450 g of distilled water.

The 2-liter round-bottomed separable flask containing the thus prepared fine monomer suspension was mounted on a separable cover equipped with a stirrer, a cooling pipe, a temperature sensor and a nitrogen introduction port, and was polymerized in a hot bath purged with nitrogen at a temperature of 63° C. for 4 to 5 hours. During the polymerization, the stirring was continued at a low speed so that the particles were not coagulated. The particle size of the polymerized suspension was measured by using a laser diffraction-type particle size distribution measuring machine. The thus obtained weight average value was regarded to be a primary particle diameter.

The suspension was dried using a spray dryer and was granulated into secondary particles having a particle diameter of from 20 to 30 μm to prepare an acrylic powder.

The molecular weight of the acrylic resin was measured by the GPC (gel permeation chromatography). By using the tetrahydrofuran (THF) as a developer solvent, the number average molecular weight was calculated from a calibration curve based upon a standard polystyrene.

The THF-insoluble components of the acrylic resin were determined in a manner as described below.

The acrylic resin (Ag) and the THF (Bg) were weighed and introduced into a 200-ml Erlenmeyer flask with a common cock such that the resin concentration was from 1 to 3% by weight, and were held therein three whole days (72 hours) with stirring using an electromagnetic stirrer to extract the THF-soluble component. The mixture was then correctly weighed (Cg) in an amount of about 30 g and was introduced into a 50-ml centrifugal tube made of TEFLON and having a closure, and was subjected to the centrifuge at 11000 rpm for 10 minutes, and the supernatant THF-soluble components were picked up. Then, the THF was added in an amount equal to the amount that was picked up above, and the mixture was subjected to the centrifuge to pick up the supernatant components, repetitively. The THF-soluble components that were picked up were transferred onto a round evaporating dish of which the weight has been known, held in an oven maintained at 70° C. for 2 hours so that the THF was evaporated. The THF-soluble components were further completely dried by heating at 100° C. for 30 minutes and, then, the THF-soluble resin components (Dg) were weighed. The THF-insoluble components were calculated (% by weight) in compliance with the formula 100−100D (A+B)/AC. To 80 g of the plasticizer were pre-mixed 7.3 g of a cross-linking agent (4 g of Epikote 828 manufactured by Yuka Shell Epoxy Co., 3 g of Cymel 303 manufactured by Mitsui Cytec Co., 0.3 g of dodecylbenzenesulfonic acid) and 3 g of titanium oxide (CR-95 manufactured by Ishihara Sangyo Co.), and to which was gradually added 100 g of the acrylic powder over a period of about 5 minutes with stirring at 500 to 1000 rpm by using a homodisper having stirrer vanes of the shape of sawteeth directed up and down along the outer periphery of the disk. The pre-mixture was further stirred at a high speed of 2000 rpm for 5 minutes to obtain a paste thereof. When the titanium oxide was to be blended, the above-mentioned pre-mixture solution was passed through a three-roll mill to disperse the titanium oxide.

The obtained paste was stirred under a reduced pressure of 4 to 6 mm Hg for 30 minutes to remove bubbles and water, thereby to prepare an acrylic plastisol.

Table 1 shows in detail a variety of acrylic plastisols used for the Examples.

[Evaluation of Adhesion Force]

The metallic base material provided with the resin layer for adhesion by such a method as coating or lamination was cut into a size of 130 mm in the vertical direction and 160 mm in the lateral direction. A heat resistant tape of TEFLON of a width of 15 mm was stuck thereto in the lateral direction leaving the upper portion of 30 mm. A suitable amount of the acrylic plastisol was placed on the TEFLON tape and was spread down using a knife coater so that the thickness was 1 mm, followed by heat treatment to prepare an adhesive sheet. The adhesive sheet was cut into a sample of a width of 10 mm in a direction at right angles of the TEFLON tape; i.e., a sample for evaluating the adhesion force was prepared having a length of 50 mm in a manner that the TEFLON tape of a width of 15 mm was at one end and the gelled acrylic plastisol was at the other end.

The peeling test for evaluating the adhesion force was conducted one week after the preparation of the adhesive sheet by using a universal tension tester. This is because, when the plastisol is adhered, the initial adhesion force often decreases to a striking degree with the passage of time. The TEFLON tape was peeled, and the sample for evaluating the adhesion force was folded in a T-shape and was sandwiched between the upper chuck and the lower chuck with the acrylic plastisol being faced upwards, and the tension testing was conducted at a cross-head speed of 200 mm/min. to evaluate the adhesion force.

The acrylic plastisol adhesion structure of the present invention exhibited the adhesion force of at least not smaller than 1.5 kgf/10 mm of width. According to this testing method, the acrylic gel was broken near 4 kgf/10 mm of width, and the adhesion force of greater than 4 kgf/10 mm of width could not be evaluated. Therefore, such cases are expressed as adhesion force >4.

[Synthesis of Resol-type Phenolic Resin]

The resol-type phenolic resin in Examples was prepared in a manner as described below.

A predetermined amount of phenols and 37% formalin were introduced into a reaction container, and a predetermined amount of magnesium hydroxide catalyst was added thereto with stirring while maintaining the temperature at 50° C. to effect the reaction for one hour. Thereafter, the reaction system was heated at 80° C. to continue the reaction for 2 to 3 hours. Then, the liquid temperature was lowered to 60° C. followed by the addition of 10% phosphoric acid solution to neutralize the catalyst. Then, a mixture solvent of methyl isobutyl ketone, toluene, cyclohexanone and cellosolve acetate at a ratio of 4:2:2:2 was added, and the formed resin was extracted, and the water of the lower layer and the catalyst were isolated and removed. Moreover, the water remaining in the resin solution was removed by the azeotropic dehydration method thereby to prepare a resol-type phenolic resin solution containing 26% of nonvolatile components.

The concentration if methylol groups of the resins was measured by the NMR method and was expressed as a number of methylol groups or etherified methylol groups per a benzene ring. The number average molecular weight of the resin was determined by the GPC (gel permeation chromatography) by using the tetrahydrofuran as a developer solvent.

Table 2 shows the details of the resol-type phenolic resins that were produced.

[Preparation of an Epoxy-phenolic Solvent-Type Coating Material]

A predetermined epoxy resin and a predetermined solvent were fed into a reaction container, and the epoxy resin was dissolved with stirring at a temperature of 80° C. over 1 to 2 hours. Next, a 26% resol-type phenolic resin solution was added thereto at a predetermined epoxy/phenol ratio, and the precondensation was carried out at 110° C. for 2 hours to prepare a desired epoxy-phenolic solvent-type coating material.

The precondensation was not carried out in the case of the epoxy-amino coating material.

[Comparative Example 1]

An epoxy resin (Epikote 1010 manufactured by Yuka Shell Epoxy Co.) was blended with various amino resins at ratios of 95/5, 90/10, 85/15 in order to prepare 12 kinds of solvent-type coating materials containing 27% of nonvolatile components. The resin was dissolved and diluted by using a mixture solvent of a butyl cellosolve and Solvesso 100 at an equal weight ratio, and four kinds of amino resins were used, i.e., Cymel 303, 325, 370 and 701 manufactured by Mitsui Cytec Co. As the curing catalyst, Catalyst 600 of Mitsui Cytec Co. was used in an amount of 0.1%.

The obtained coating material was applied onto a 0.23 mm-thick tin plate (plated with tin in an amount of 2.8 g/m$^2$, temper: T4CA) using a bar coater of #14, and was baked under the conditions of 190° C. for 10 minutes to prepare a coted plate. The coated plate possessed the coating in an amount in a dry state of 53±2 mg/100 cm$^2$. The MEK extraction factor was smaller than 7% by weight. The MEK extraction factor in Examples was reduction of amount due to extraction amount of coating of when the coated plate was extracted at a boiling point of the methyl ethyl ketone for one hour.

Three kinds of acrylic plastisols A, B and D were baked on the coated plate under the conditions of 180° C. for 3 minutes to evaluate the adhesion forces which were all smaller than 0.3 kgf/10 mm of width.

[Comparative Example 2]

An epoxy-phenolic size coating material was applied onto a 0.17 mm-thick tin plate (plated with tin in an amount of 2.8 g/m$^2$, temper: T4CA) such that the amount of the coating when dried was 15 mg/100 cm$^2$, and was baked under the conditions of 190° C. for 10 minutes. Then, an organosol coating material (8510-J05M) manufactured by Dexter-midland Co. was applied such that the amount of the coating when dried was 100 mg/100 cm$^2$ and was baked at 190° C. for 10 minutes. The size coating material used here was a coating material obtained by combining an epoxy resin (Epikote 1010) (Mn: 5,200, epoxy equivalent: 3,700 g/eq) manufactured by Yuka Shell Epoxy Co. and a phenolic resin A as a curing agent at an epoxy/phenol ratio of 85/15.

The acrylic plastisol was baked on the coated plate at 180° C. for 3 minutes to evaluate the adhesion force which was 0.1 kgf/10 mm of width.

Onto the outer surface of the same tin plate was applied a polyesteramino coating material (L-144WCA) manufactured by Toyo Ink Seizo co. and onto the inner surface was applied the above-mentioned coating material. The tin plate was formed into a lug cap having a diameter of 63 mm. The cap was lined with the acrylic plastisol D which was baked at 210° C. for 90 seconds to form a liner. While maintaining the head space of 10 cc, a glass bottle having a content of 125 cc was filled with the hot water heated at 90° C. and to which the cap was fitted. Two weeks after the packaging, a reduction in the pressure was measured by using a vacuum gauge. The internal pressure was equal to the atmospheric pressure, from which it was confirmed that the sealing had not been accomplished. The cap was opened and it was found that the PVC coating had been dissolved with the plasticizer in the plastisol.

[Comparative Example 3]

The polyesteramino coating material (L-144WCA) manufactured by Toyo Ink Seizo Co. was baked on the coated plate having the epoxy-phenolic size coating material used in Comparative Example 2 at 195° C. for 10 minutes such that the amount of the coating material when dried was 100 mg/100 cm$^2$. Onto this coating plate were baked acrylic plastisols A to F at 220° C. for 90 seconds to evaluate the adhesion forces which were all not larger than 0.3 kgf 710 mm of width.

[Comparative Example 4]

A PET (polyethylene terephthalate)-laminated steel plate (trade name: Ili-pet) manufactured by Toyo Kohan Co. was cut out, and on which were baked the acrylic plastisols A to F under the conditions of 210° C. for 90 seconds to evaluate the adhesion forces which were all not larger than 0.3 kgf/10 mm of width.

[Examples 1 to 5, Comparative Examples 5 to 7]

An epoxy resin (Epikote 1010) manufactured by Yuka Shell Epoxy Co. (Mn: 5,260, epoxy equivalent: 3,700 g/eq) and a phenolic resin A as a curing agent were combined together at a variety of epoxy/phenol ratios to prepare solvent-type coating materials containing 27% of non-volatile components. As a diluent, use was made of a mixture of a butyl cellosolve and Solvesso 100 of an equal weight ratio. Depending upon the requirement, phosphoric acid was used as a catalyst for curing.

The thus prepared coating materials were applied onto the tin plate used in Comparative Example 1 by using a bar coater of #14, and were baked under the conditions of 190° C. for 10 minutes to prepare coated plates. Then, the acrylic plastisol D was further baked thereon under the conditions of 180° C. for 3 minutes to prepare samples for evaluating the adhesion forces. The coated plates were subjected to the retort whitening testing under the conditions of 120° C. for 30 minutes.

The coating material compositions and the results of evaluating the adhesion forces were as shown in Table 3. In the epoxy-phenolic coating materials, when the amount of phenolic was increased to increase the hardness of the coating as shown in Examples 1 to 5 and in Comparative Example 5, the adhesion force relative to the acrylic plastisol decreased, and almost no adhesion force was exhibited as the amount of phenolic resin exceeded 15% of the resin component. As shown in Comparative Example 7, furthermore, when the amount of phenolic resin was very decreased, the adhesion force could be obtained but the hardness was so low that the coating exhibited deteriorated properties lending itself not suited for being used in the closures.

[Examples 6, 7 and Comparative Examples 8 to 12]

A variety of epoxy resins having different molecular weights manufactured by Yuka Shell Epoxy Co. were combined with a phenolic resin B as a curing agent at a variety of ratios to prepare the solvent-type coating materials. The content of the non-volatile components was 27%. The resin and the curing agents were dissolved and diluted by using a mixture of a butyl cellosolve and Solvesso 100 at an equal weight ratio.

The thus prepared coating materials were applied onto the tin plate used in Comparative Example 1 by using a bar coater of #14, and were baked under the conditions of 190° C. for 10 minutes to prepare coated plates. Then, the acrylic plastisol B was further baked thereon under the conditions of 220° C. for 90 seconds to prepare samples for evaluating the adhesion forces. The coated plates were subjected to the retort whitening testing under the conditions of 120° C. for 30 minutes.

The coating material compositions and the results of evaluating the adhesion forces were as shown in Table 4. It will be understood from the results of Table 4 that when the coating material for adhesion uses an epoxy resin having a molecular weight of smaller than 5000 and an epoxy equivalent of smaller than 3500 g/eq and when the phenolic resin is used in an amount of from 1 to 15% with respect to the resin component, the coating fails to exhibit satisfactory properties though the adhesion force could be obtained with respect to the acrylic plastisol.

Next, the size coating material used in Comparative Example 2 was applied in an amount of 15 mg/100 cm² onto both surfaces of the tin plate used in Comparative Example 2, and was baked at 190° C. for 8 minutes. Onto the inner surface was further applied the coating materials prepared in Examples and in Comparative Examples in an amount of 60 mg/100 cm², which were then baked under the conditions of 190° C. for 8 minutes. Onto the outer surface was applied a polyester coating material containing a pigment (titanium oxide) manufactured by Toyo Ink Seizo Co. in an amount of 100 mg/100 cm², which was then baked under the conditions of 190° C. for 8 minutes.

The thus obtained coated plates were formed into lug caps of a diameter of 63 mm, which were lined with the acrylic plastisol D and were baked at 210° C. for 90 seconds. A glass bottle having a content of 125 cc was filled with 100 cc of an aqueous water for corrosion testing containing 5% by weight of acetic acid and 2% by weight of table salt. The glass bottle was sealed with the lug cap equipped with the acrylic liner and was left to stand upright at 40° C. for one week to effect the corrosion promotion testing. After one week, the cap was opened to check the corroded state. The lug caps of Comparative Examples 8 to 12 had been corroded at the molded and worked portions, but the lug caps of Examples 6 and 7 had not been corroded.

[Example 8]

An epoxy resin (Epikote 1010J) (Mn: 5,500, epoxy equivalent: 5,200 g/eq) manufactured by Yuka Shell Epoxy Co. and a phenolic resin A as a curing agent were combined together at a ratio of 80/20 to prepare a size coating material containing 20% of non-volatile components. The size coating material was applied onto both surfaces of the 0.17 mm-thick tin plate used in Comparative Example 2 in an amount of 15 mg/100 cm², respectively, and was baked at 190° C. for 8 minutes.

Next, the same epoxy resin and the same phenolic resin were combined together at a ratio of 95/5, which was then blended with a pigment (a mixture of titanium oxide and red iron oxide) in an amount of 40 parts with respect to the resin component in order to prepare a top coat for adhesion of a beige color containing 34% of non-volatile components. This was applied onto one surface of the above-mentioned size coated plate in an amount of 100 mg/100 cm² and was baked at 190° C. for 8 minutes.

The solvent used for preparing the size coating material and top coating of Examples was a mixture solvent of butyl cellosolve, Solvesso 100, methyl isobutyl carbinol and is isophorone at a ratio of 4:3:2:1.

Onto the other surface was applied a polyester coating material containing a pigment (titanium oxide) manufactured by Toyo Ink Seizo Co. in an amount of 100 mg/100 cm², which was then baked at 190° C. for 8 minutes.

The acrylic plastisols A to D were baked on the top coating for adhesion of the thus obtained coated plate and were baked under the conditions of 220° C. for 90 seconds to evaluate the adhesion forces which were 3.5 kgf/10 mm of width.

Then, the thus obtained coated plates were formed into lug caps having a diameter of 63 mm which were lined with the acrylic plastisol D and were baked under the conditions of 210° C. for 90 seconds. A glass bottle having a content of 125 cc was filled with 100 cc of an aqueous water for corrosion testing containing 5% by weight of acetic acid and 2% by weight of table salt. The glass bottle was sealed with a lug cap equipped with the acrylic liner and was left to stand upright at 40° C. for one week to effect the corrosion promotion testing. After one week, the cap was opened but no corrosion was observed en the inner surface, and the liner had been adhered favorably.

[Example 9]

The acrylic plastisol E was baked on the coated plate obtained in Example 8 under the conditions of 220° C. for 90 seconds to evaluate the adhesion force which was 3.1 kgf/10 mm of width.

[Comparative Example 13]

The acrylic plastisol F was baked on the coated plate obtained in Example 8 under the conditions of 220° C. for 90 seconds to evaluate the adhesion force which was 0.3 kgf/10 mm of width.

[Example 10]

A phenoxy resin (PKHH)(Mn: 12,200, epoxy equivalent: 26,000 g/eq) manufactured by Phenoxy Associate Co. and a phenolic resin B as a curing agent were combined together at a ratio of 95/5 to prepare a solvent-type coating material. The resin was dissolved and diluted using a mixture of a butyl cellosolve and Solvesso 100 at an equal weight ratio, so as to adjust the amount of the non-volatile components to be 19%. The coating material obtained here was applied onto the tin plate used in Comparative Example 1 so that the amount of coating was 50 mg/100 cm$^2$ and was baked under the conditions of 200° C. for 8 minutes.

The acrylic plastisols A to D were baked on the above coated plate under the conditions of 220° C. for 90 seconds to evaluate the adhesion forces. All of the samples exhibited adhesion forces of not smaller than 3.0 kgf/10 mm of width.

Furthermore, a lug cap was prepared in the same manner as in Example 8 but replacing the top coating for adhesion on the inner surface by the coating material of this Example 10 which was applied in an amount of 50 mg/100 cm$^2$, in order to evaluate its corrosion resistance. Favorable results were obtained.

[Example 11]

A bisphenol F epoxy resin (Epikote 4010P) (Mn: 6200, epoxy equivalent: 4100 g/eq) manufactured by Yuka Shell Epoxy Co. and a phenolic resin C as a curing agent were combined together at ratios of 95/5 and 90/10 to prepare solvent-type coating materials. The solvent used for preparing the coating materials was a mixture of a butylcarbitol and a butyl cellosolve at a ratio of 3:7, and the amount of the non-volatile components was adjusted to be 27%.

The coating materials were applied on a 0.25 mm-thick aluminum plate (material 5052) in an amount of 50 mg/100 cm$^2$ and were baked at 180 for 10 minutes. Furthermore, the acrylic plastisol D was baked at 230° C. for 90 seconds to evaluate its adhesion force which was 2.4 kgf/10 mm of width when the epoxy/phenol ratio was 95/5 and was 2.1 kgf/10 mm of width when the epoxy/phenol ratio was 90/10.

Furthermore, a lug cap was prepared in the same manner as in Example 8 but replacing the top coating for adhesion on the inner surface by the coating material of this Example 11 which was applied in an amount of 50 mg/100 cm$^2$, in order to evaluate its corrosion resistance. Favorable results were obtained. The liner had been adhered well, too.

[Example 12]

Into a 2-liter reaction container equipped with stirrer, cooling pipe, monomer tank, nitrogen introduction port, temperature sensor and heating unit were introduced 350 g of a phenoxy resin (PKHH) manufactured by Phenoxy Associate Co., 210 of n-butanol, and 140 g of butyl cellosolve, which were stirred at 120° C. for one hour to dissolve the resin.

Then, the reaction container was purged with nitrogen, and a pre-mixture of 40.3 g of methacrylic acid, 21.2 g of styrene, 0.3 g of ethyl acrylate, 5.8 g of 75% benzoyl peroxide and 20 g of butyl cellosolve, was fed into a monomer tank, stirred while maintaining the temperature at 120° C., and was dropwisely added thereto over a period of 30 minutes. Thereafter, the mixture was maintained at 120° C. for 30 minutes to modify the phenoxy resin with acrylic.

The acrylic-modified phenoxy resin solution was no longer heated and its temperature was lowered down to 90° C. Then, 27 g of a resin solution containing 26% of phenolic resin A and 27 g of a resin solution containing 26% of phenolic resin B were added as curing agents thereto and were dissolved. Thereafter, 20.9 g of a dimethylaminomethanol was added thereto with stirring, and 800 g of distilled water was dropwisely added thereto from the monomer tank over a period of 10 minutes to prepare an aqueous dispersion of a white milk color.

The aqueous dispersion was blended with 20 parts of titanium oxide (CR-95 manufactured by Ishihara Sangyo Co.) with respect to the non-volatile components in the aqueous dispersion, and the mixture was kneaded using a three-roll mill for 10 minutes to disperse the pigment. The mixture was then condensed using a rotary evaporator to prepare an aqueous coating material having 35% of non-volatile components.

The above-mentioned aqueous coating material was applied onto the tin plate used in Comparative Example 1 in an amount of 90 mg/100 cm$^2$, baked under the conditions of 200° C. for 10 minutes and, then, the acrylic plastisol D was baked thereon under the conditions of 220° C. for 90 seconds to evaluate the adhesion force which was not smaller than 4 kgf/10 mm of width.

Furthermore, a lug cap was prepared in the same manner as in Example 8 but replacing the top coating for adhesion on the inner surface by the aqueous coating material of this Example 12, in order to evaluate its corrosion resistance. Favorable results were obtained.

[Example 13]

The top coating for adhesion used in Example 10 was applied in an amount of 15 mg/100 cm$^2$ onto one surface of a PET-laminated steel plate (trade name Hi-pet) manufactured by Toyo Koban Co. used in Comparative Example 4 and was baked Under the conditions of 220° C. for 2 minutes.

Then, the thus obtained coated plate was formed into a lug cap having a diameter of 63 mm with the side of the adhesive coating being faced inwards, and was lined with the acrylic plastisol D and was baked under the conditions of 210° C. for 90 seconds. A glass bottle having a content of 125 cc was filled with 100 cc of an aqueous water for corrosion testing containing 5% by weight of acetic acid and 2% by weight of table salt. The glass bottle was sealed with the lug cap equipped with the acrylic liner and was left to stand upright at 40° C. for one week to effect the corrosion promotion testing. After one week, the cap was opened but no corrosion was observed on the inner surface, and the liner had been adhered very favorably.

[Example 14]

An epoxy resin (Epikote 1010J) manufactured by Yuka Shell Epoxy Co. and a phenolic resin B as a curing agent were combined together at a ratio of 85/15, and were further blended with titanium oxide (CR-95) manufactured by Ishihara Sangyo Co., in an amount of 40 parts with respect to the resin components, in order to prepare a base coating material containing 36% of non-volatile components. The coating material was applied onto both surfaces of the 0.17 mm-thick tin plate used in Comparative Example 2 in an amount of 100 mg/100 cm$^2$, respectively, and was baked at 190° C. for 8 minutes.

Next, the same epoxy resin and the phenolic resin A were combined together at a ratio of 95/5 to prepare a top coat for adhesion Containing 20% of non-volatile components. This was applied onto one surface of the above-mentioned coated plate in an amount of 15 mg/100 cm$^2$ and was baked at 190° C. for 8 minutes.

The solvent used for preparing the coating material of this Example 14 was a mixture solvent of butyl cellosolve, Solvesso 100, methyl isobutyl carbinol and isophorone at a ratio of 4:3:2:1.

The acrylic plastisol D was baked on the top coating for adhesion of the thus obtained coated plate and was baked under the conditions of 220° C. for 90 seconds to evaluate the adhesion force which was 3.3 kgf/10 mm of width.

Then, the thus obtained coated plate was formed into a lug cap having a diameter of 63 mm with the side of the adhesive coating being faced inwards and was lined with the acrylic plastisol D and was baked under the conditions of 210° C. for 90 seconds. A glass bottle having a content of 125 cc was filled with 100 cc of an aqueous water for corrosion testing containing 5% by weight of acetic acid and 2% by weight of table salt. The glass bottle was sealed with the lug cap equipped with the acrylic liner and was left to stand upright at 40° C. for one week to effect the corrosion promotion testing. After one week, the cap was opened but no corrosion was observed on the inner surface, and the liner had been adhered favorably.

TABLE 1

Acrylic plastisols used in Examples and in Comparative Examples

| Plastizol | A | B | C | D | E | F |
|---|---|---|---|---|---|---|
| Resin composition (%) | | | | | | |
| MMA | 99 | 99 | 69 | 95 | 99 | 69 |
| BA | | | 30 | | | 30 |
| AA | 0.2 | 0.2 | 0.2 | | 0.2 | 0.2 |
| MAA | 0.8 | 0.8 | 0.8 | | 0.8 | 0.8 |
| GMA | | | | 5 | | |
| Sol composition | | | | | | |
| Resin (parts) | 100 | 100 | 100 | 100 | 100 | 100 |
| Plasticizer (kind) | 80 (ATBC) | 80 (ATBC) | 80 (ATBC) | 80 (ATBC) | 80 (TCP) | 80 (DOP) |
| Crosslinking agent | | 7.3 | 7.3 | 7.3 | | |
| Titanium oxide | | | | 3 | 3 | 3 |
| Particle diameter (μm) | 1.2 | 0.9 | 1.0 | 1.4 | 0.9 | 1.0 |
| Molecular weight ($\times 10^5$) | 3.2 | 11.5 | 13.0 | 10.8 | 11.5 | 13.0 |
| THF-insoluble components (%) | <5 | <5 | <5 | 61 | <5 | <5 |

BA: butyl acrylate
AA: acrylic acid
MAA: methacrylic acid
GMA: glycidyl methacrylate
DOP: dioctyl phthalate

TABLE 2

Resol-type phenolic resin

| Resol-type phenolic resin | Starting phenol (parts) | Formalin (parts) | Amount of catalyst (parts) | Mn | Concentration of methylol groups |
|---|---|---|---|---|---|
| Phenolic resin A | paracresol 65 | 170 | 4 | 330 | 0.81 |
| Phenolic resin B | bisphenol A 114 | 138 | 3 | 650 | 0.68 |
| Phenolic resin C | bisphenol A 114 | 108 | 3 | 830 | 0.50 |

TABLE 3

Results of evaluation of Examples 1 to 5 and Comparative Examples 5 to 7

| | Epoxy/phenolic ratio | Amount of phosphoric acid (%)/resin | MEK extraction factor (%) | Adhesion force (kgf/10 mm) | Retort whitening 120° C.-30 min. |
|---|---|---|---|---|---|
| Example 1 | 97/3 | 0.1 | 22.2 | 3.8 | no |
| Example 2 | 95/5 | 0 | 20.1 | 2.9 | no |
| Example 3 | 93/7 | 0 | 15.8 | 2.6 | no |
| Example 4 | 90/10 | 0 | 10.3 | 2.0 | no |
| Example 5 | 85/15 | 0 | 8.5 | 1.5 | no |
| Comparative Example 5 | 83/17 | 0 | 6.2 | 0.5 | no |
| Comparative Example 6 | 80/20 | 0 | 4.3 | 0.3 | no |
| Comparative Example 7 | 99.5/0.5 | 0.1 | 48.9 | >4 | whitened |

TABLE 4

Results of evaluation of Examples 6, 7 and Comparative Examples 8 to 12

| | Epoxy resin | | | | Phosphoric acid (%)/ resin | MEK extraction | Adhesion force | Retort whitening |
|---|---|---|---|---|---|---|---|---|
| | Epikote # | Mn | Epoxy equivalent | Epoxy/phenolic ratio | | | | |
| Comparative Example 8 | 1007 | 3000 | 1900 | 95/5 | 0.1 | 48.4 | 2.9 | whitened |
| Comparative Example 9 | " | " | " | 90/10 | 0 | 44.5 | 3.1 | whitened |
| Comparative Example 10 | 1009 | 3900 | 2600 | 95/5 | 0.1 | 42.1 | 3.0 | whitened |
| Comparative Example 11 | " | " | " | 90/10 | 0 | 38.6 | 2.7 | whitened |
| Comparative Example 12 | " | " | " | 85/15 | 0 | 25.5 | 0.7 | no |
| Example 6 | 1010 | 5200 | 3700 | 95/5 | 0.1 | 24.9 | 2.7 | no |
| Example 7 | " | " | " | 90/10 | 0 | 22.8 | 2.2 | no |

According to the present invention, an acrylic plastisol is applied onto a metallic base material which is provided with a layer of an epoxy-phenolic thermosetting resin of a particular ratio, and is heat-treated so as to be gelled and is, at the same time, strongly adhered to the layer of the thermosetting resin within short periods of time. The obtained adhesion structure exhibits excellent resistance against peeling, resistance against corrosion and resistance against retorting.

We claim:

1. An adhesion structure comprising a metallic base material or a metallic base material having an organic coating and a gel of an acrylic plastisol which are adhered together via a thermosetting resin layer which contains a bisphenol-type epoxy resin and a phenolic resin at a weight ratio of from 99:1 to 85:15.

2. An adhesion structure according to claim 1, wherein the bisphenol-type epoxy resin in said thermosetting resin has a number average molecular weight of from 5,000 to 50,000 and an epoxy equivalent which is not smaller than 3,500.

3. An adhesion structure according to claim 1, wherein the phenolic resin in said thermosetting resin is derived from a bifunctional monocyclic phenol and/or bisphenols and has a number average molecular weight of from 200 to 1,000.

4. An adhesion structure according to claim 1, wherein the acrylic plastisol contains an acrylic resin having a number average molecular weight of not smaller than 100,000.

5. An adhesion structure according to claim 1, wherein the acrylic resin in the acrylic plastisol comprises a methyl methacrylate (MMA) as a chief monomer component and contains a small amount of a functional group-containing monomer component.

6. An adhesion structure according to claim 1, wherein the acrylic plastisol contains a plasticizer having a solubility parameter (SP value) of from 8.9 to 9.7.

7. An adhesion structure according to claim 1, wherein the acrylic plastisol contains a functional group-containing acrylic resin and a cross-linking agent which is reactive to said functional group.

8. An adhesion structure according to claim 1, wherein the acrylic resin in the acrylic plastisol contains from 10 to 80% of tetrahydrofuran-insoluble components.

9. An adhesion structure according to claim 1, wherein the metallic base material or the metallic base material having an organic coating is a closure, and the acrylic plastisol in a liner for sealing.

10. An adhesion structure according to claim 1, wherein the metallic base material having an organic coating is the metallic base material having a curable coating which contains the bisphenol-type epoxy resin and the phenolic resin at a weight ratio of from 85:15 to 70:30, and has an MEK extraction factor at a boiling point over one hour of not larger than 8%.

11. A method of producing an adhesion structure by applying an acrylic plastisol onto a metallic base material or a metallic base material having an organic coating which is provided with a thermosetting resin layer that contains a bisphenol-type epoxy resin and a phenolic resin at a weight ratio of from 99:1 to 85:15, gelling the acrylic plastisol by heating and, at the same time, adhering the acrylic plastisol onto the base material via said thermosetting resin layer.

* * * * *